United States Patent Office 3,137,668
Patented June 16, 1964

3,137,668
ANTI-STATIC COATING COMPOSITION COMPRISING STYRENE SULFONATE-GLYCIDYL METHACRYLATE POLYMER AND SODIUM BISULFITE
James R. Kuppers, Misenheimer, N.C., assignor to E. I. du Pont de Nemours and Company, Wilmington, Del., a corporation of Delaware
No Drawing. Filed Apr. 2, 1962, Ser. No. 184,507
8 Claims. (Cl. 260—29.6)

This invention relates to polyester articles coated with polymeric antistatic and antisoiling agents. More particularly, the invention is concerned with a method of improving the durability of hydrophilic coatings on polyester fibers and other shaped articles.

Synthetic linear condensation polyesters such as poly(ethylene terephthalate) and poly(hexahydro-p-xylylene terephthalate) have become important items of commerce in the form of fibers and films, as well as molded articles of various shapes and sizes. The many desirable properties of these polyesters are well known, but one particular property is undesirable for some uses, i.e., the extreme hydrophobicity which results in the rapid build-up and easy retention of static electrical charges on these polyester articles. Many attempts have been made to reduce this tendency toward the buildup and retention of static charges by coating the surface of polyester articles with hydrophilic polymers. A number of attractive hydrophilic coatings have been developed in recent years for use on polyester articles, some of them imparting both antistatic and antisoiling effects, but all of them have suffered from the problem of poor durability in a greater or lesser degree. By durability is meant resistance to damage by mechanical abrasion and erosion and by exposure to various chemical materials. Good durability is particularly important for polyester textile garments which are subjected to repeated washings and ironings during the life of the garment.

It is an object of this invention to provide synthetic polyester articles having hydrophilic antistatic coatings of improved durability. Another object is the provision of a procedure for applying antistatic coatings to polyester shaped articles which results in a coating of improved durability. Still another object is the provision of improved antistatic coating compositions for synthetic linear condensation polyester articles.

It has been discovered that in the application of antistatic polymeric coatings ot a synthetic linear condensation polyester shaped structure, the presence of sodium bisulfate in the coating composition results in a surprising improvement in the durability of the coating on the polyester structure. These results are particularly surprising in view of the fact that a similar improvement is not obtained when the sodium bisulfate is replaced with other inorganic reagents such as sodium sulfate, sodium chloride, sodium dihydrogen phosphate, acetic acid, phosphoric acid, or hydrochloric acid.

Therefore, the objects of this invention are accomplished by a process for changing the surface characteristics of a polyester article which comprises applying to the surface of a synthetic linear condensation polyester shaped structure an aqueous dispersion of a curable hydrophilic polymer characterized in that the aqueous phase also contains at least 3% sodium bisulfate, drying the dispersion onto the polyester structure, curing the coated structure at an elevated temperature, and thereafter removing water-soluble materials from the surface of said structure.

The term "synthetic linear condensation polyester," as used herein, comprehends a substantially linear polymer of fiber-forming molecular weight comprising a series of predominantly carbon-atom chains joined by recurring carbonyloxy radicals,

As used herein, the term "polyester" is intended to include copolyesters, terpolyesters, and the like. Included, for example, are the polyesters disclosed in U.S. 2,465,319 and U.S. 2,901,466. Polyesters having an intrinsic viscosity of at least about 0.3 are considered to be fiber-forming molecular weight.

By "aqueous dispersion" we refer to a mixture in which the active ingredients of the coating composition are either dissolved or suspended in a liquid medium which is at least 80% water. Other solvents which may be present in minor amounts, i.e., up to about 20%, include, for example, methyl alcohol, ethyl alcohol, acetone, and tetrahydrofuran.

By "hydrophilic polymer," we refer to any polymer which has a moisture regain appreciably greater than a synthetic linear condensation polyester. Preferred hydrophilic polymers have a moisture regain of 20% or higher. Generally speaking, "curable" hydrophilic polymers are preferred, i.e., polymers which may be further polymerized or crosslinked after they are applied to the polyester article. For example, the hydrophilic polymer may contain methylol or epoxy groups. Specific examples of such hydrophilic polymers are shown in the examples below.

The sodium bisulfate in the aqueous dispersion must be present in a concentration of at least 3%. Concentrations appreciably below 3% do not give the improved durability which is the object of this invention. Concentrations up to 28% or higher may be used if desired, but for ease of handling it is usually preferred to keep the concentration below that of a saturated solution at room temperature. The preferred concentration range is from 3 to 20%.

Although the reason for the effect obtained in the presence of sodium bisulfate is not fully understood, it is theorized that the sodium bisulfate acts as a swelling agent for the outer layer of the polyester shaped structure and thereby allows a certain amount of the hydrophilic polymeric coating to diffuse into this swollen outer layer and become firmly attached to this layer during the curing operation. In any case, the fact of improved durability of polymeric coatings afforded by this invention is readily demonstrated in laboratory tests and in actual use.

The effects of the development and retention of a static charge in a textile fabric are apparent to the wearer of the fabric in the clinging of the garment to the wearer and in the pickup of lint. A laboratory test which correlates well with actual wearing experience consists of applying a high voltage to the sample and then measuring the time for half of the charge to decay to ground and atmosphere ($T_{1/2}$). Control fabrics of uncoated polyethylene terephthalate give $T_{1/2}$ values greater than 2400 seconds in this test. Values of 200 seconds or less indicate good static performance as evidenced by freedom from static in subjective tests. Cotton, for example, gives $T_{1/2}$ values in the range 100–200 at a relative humidity of 35%.

The following examples are cited to illustrate the practice of this invention and are not intended to limit the scope thereof.

EXAMPLE I

Methyl methacrylate (35.7 grams) is mixed with glycidyl methacrylate (9.1 grams) in a beaker. 5.7 grams of a nonylphenoxy(polyoxyethylene)ethanol condensation product of nonylphenol and ethylene oxide, containing approximately 88% combined ethoxide based on the weight of nonylphenol, and 0.5 gram of glycerol monooleate emulsifiers are added to 566 ml. distilled water in a Waring Blendor and emulsified for about 10 minutes. While the Waring Blendor turns at a moderate rate of speed, the mixed monomers are added to the Blendor, followed by sodium styrene sulfonate (53 grams containing 17% water hydration). After approximately 10 minutes of vigorous stirring, the charge is transferred to a 3-neck, 500 ml. round-bottom reaction flask equipped with a mechanical stirrer, an inlet for nitrogen, and reflux condenser. Stirring is started and 0.3 grams of potassium persulfate (0.3% based on monomers) is added. The system is deaerated with nitrogen, and 0.1 gram of sodium bisulfite (0.1% based on monomers) is added. Polymerization is conducted for 4 hours at 45° C. under a blanket of nitrogen and is complete after this time. The emulsion obtained is stable for a period of several months and the polymer is shown to have retained active epoxide groups. A portion of the emulsion is coagulated by evaporation to dryness, and the coagulated polymer is washed and dried. The amount of polymer obtained indicates approximately 100% yield. Since the conversion is almost theoretical, the terpolymer composition corresponds closely to the monomer feed ratio of 40 parts of methyl methacrylate/50 parts of sodium styrene sulfonate/10 parts glycidyl methacrylate, and is confirmed by sulfur analysis which indicates 50±3% combined sodium styrene sulfonate.

The aqueous polymer dispersion prepared above is diluted with water and sodium bisulfate is added to give a solution containing 3% sodium bisulfate and 1.5% organic polymer.

Swatches of a tropical fabric woven from polyethylene terephthalate yarn are dipped in the above solution and squeezed out to give approximately 70% wet pickup. The swatches are then placed in an oven at a temperature of 160° C. for 15 minutes for curing. After curing, the fabric swatches are boiled for 90 minutes in a scouring solution consisting of 0.2% sodium lauryl sulfate in water, and dried. When tested for static propensity, the fabric samples thus treated are found to have almost no tendency to develop a static charge.

The treated samples are then subjected to a series of 10 simulated laundry-pressing cycles in which the samples are subjected to a normal home washing-machine laundry procedure for 20 minutes at 70° C. in a solution of soap and sodium silicate, and then rinsed and dried and pressed with a steam iron. After this procedure, the samples are tested for rate of static decay according to the procedure previously outlined and found to have $T_{1/2}$ values of approximately 10 seconds at 40% RH.

The above procedure is repeated using no sodium bisulfate in the aqueous dispersion. After a series of 10 simulated home laundry-pressing cycles, the fabric samples give a $T_{1/2}$ value greater than 180 seconds indicating an appreciable loss in static protection.

EXAMPLE II

Aqueous dispersions of the following curable hydrophilic polymers are prepared according to the general procedure of Example I: (1) sodium styrene sulfonate/octylacrylate/glycidyl methacrylate (50/40/10) (coded SSS/OA/GMA), (2) sodium styrene sulfonate/styrene/glycidyl methacrylate (50/40/10) (coded SSS/S/GMA), (3) sodium styrene sulfonate/N-vinyl pyrrolidone/glycidyl methacrylate (40/40/20) (coded SSS/NVP/GMA), (4) sodium styrene sulfonate/methyl methacrylate/glycidyl methacrylate (50/40/10) (coded SS/MMA/GMA). Each of these solutions is diluted with water to give a dispersion of 1.5% organic solids and sufficient sodium bisulfate is added to give the concentration indicated in the table.

Sample swatches of polyethylene terephthalate tropical fabric are treated with these aqueous dispersions in accordance with the procedure of Example I and subjected to a series of 10 simulated home laundry-pressing cycles. The durability of the antistatic coatings to the laundry treatment is indicated by the static decay half-life values shown in the table. It is seen that sodium bisulfate concentrations of about 3% and higher are necessary for the improved results of this invention.

Table I
STATIC DECAY HALF-LIFE AT 40% RH AFTER TEN LAUNDRY-PRESS CYCLES

| Sodium Bisulfate Concentration | SSS/ MMA/ GMA $T_{1/2}$ | SSS/ OA/ GMA $T_{1/2}$ | SSS/S/ GMA $T_{1/2}$ | SSS/ NVP/ GMA $T_{1/2}$ |
|---|---|---|---|---|
| 0 (control) | 180 | 180 | 180 | 180 |
| 0.6 (control) | 180 | 180 | 180 | 180 |
| 3 | 10 | | | 12 |
| 10 | 10 | 10 | 12 | |
| 20 | 1 | 40 | 10 | 40 |

EXAMPLE III

An aqueous dispersion of sodium styrene sulfonate/octylacrylate/glycidyl methacrylate (50/40/10) is prepared according to the general procedure of Example I and diluted to 1.5% solids with distilled water. Sufficient sodium bisulfate is added to the aqueous dispersion to give a concentration of 25% based upon the total weight of the dispersion. A sample of polyethylene terephthalate film is coated with this dispersion by immersing the film in the dispersion for 10 seconds, removing the film from the dispersion and placing it in an oven at 160° C. for a period of 15 minutes to dry and cure the coating, rinsing the film in running water for 1 minute, and then drying the coated film. The sample thus produced is coded Sample A.

The above procedure is repeated with no sodium bisulfate present in the dispersion, and the sample is coded Sample B.

Sample C is prepared as above with the exception that 25% sodium sulfate is added to the organic polymer dispersion instead of sodium bisulfate.

Sample D is prepared as above with the exception that 10% hydrochloric acid is added to the organic polymer dispersion instead of sodium bisulfate.

The procedure is repeated with 0.5% ditertiarybutyl benzoperoxide added to the polymeric dispersion in place of the sodium bisulfate to give Sample E.

The characteristics of the coated film samples prepared above are summarized in the following table, which clearly shows the superior results achieved by the process of this invention.

Table II

| Film Sample | Performance |
|---|---|
| A (Test) | Dry coating, very resistant to wet abrasive action. |
| B (Control) | Tacky in humid air, easily abraded when wet. |
| C (Control) | Dry coating, easily abraded when wet. |
| D (Control) | Tacky in humid air, easily abraded when wet. |
| E (Control) | Do. |

EXAMPLE IV

Following the general procedure of Example I, polyethylene terephthalate tropical fabric is coated by immersing it in an aqueous dispersion of sodium styrene sulfonate/methyl methacrylate/glycidyl methacrylate (50/40/10) containing 20% sodium bisulfate, and curing the coating on the fabric at a temperature of 140° C. for 5 minutes. The static protection imparted to the fabric by the coating is found to be durable through a series of 5 laundry-press cycles.

The experiment is repeated with no sodium bisulfate present in the coating dispersion. In contrast to the above, the coated fabric produced is found to suffer a substantial loss in static protection after a series of 5 laundry-press cycles.

EXAMPLE V

The procedure of Example IV is repeated using an aqueous dispersion of copolymerized sodium styrene sulfonate/glycidyl methacrylate (90/10) containing 20% sodium bisulfate. The coating is cured on the fabric at 160° C. for 15 minutes. The static protection imparted by the coating is found to be durable through a series of 5 laundry-press cycles.

The procedure is repeated with no sodium bisulfate present. A substantial loss in statis protection is observed after a single laundry-press cycle.

Although the preceding examples have been restricted to fabric and film samples prepared from polyethylene terephthalate, it is to be understood that fabrics and films from any synthetic linear condensation polyester may be substituted in the examples with substantially equivalent results. Likewise, other shaped structures such as rods, pellicles, bars, tubing, and other molded shapes may be coated with hydrophilic polymers with the assistance of sodium bisulfate and found to give essentially the same improvement in durability as illustrated in the examples.

In addition to the hydrophilic polymers specifically described in the examples, any other curable hydrophilic polymer dispersion may be used. Useful hydrophilic polymers which may be mentioned include the copolymers acrylic acid/glycidyl methacrylate and styrene sulfonate/glycidyl methacrylate, similar vinyl polymers containing glycidyl methacrylate which has been esterified with a polyethylene glycol, and various hydrophilic polymers containing crosslinkable N-methylolacrylamide groups.

It will be apparent that many widely different embodiments of this invention may be made without departing from the spirit and scope thereof, and therefore it is not intended to be limited except as indicated in the appended claims.

I claim:

1. In the process of applying a hydrophilic coating to synthetic linear condensation polyester shaped articles to impart antistatic properties, the improvement of coating the shaped article with an aqueous dispersion of a styrene sulfonate/glycidyl methacrylate polymer containing in solution 3% to 20% by weight of sodium bisulfate, drying and curing the coating on the article, and washing water-soluble materials from the coated article.

2. An antistatic coating composition comprising an aqueous dispersion of a styrene sulfonate/glycidyl methacrylate polymer contaning in solution 3% to 20% by weight of sodium bisulfate.

3. An antistatic coating composition comprising an aqueous dispersion of the polymer sodium styrene sulfonate/octylacrylate/glycidyl methacrylate (50/40/10) containing in solution 3% to 20% by weight of sodium bisulfate.

4. An antistatic coating composition comprising an aqueous dispersion of the polymer sodium styrene sulfonate/styrene/glycidyl methacrylate (50/40/10) containing in solution 3% to 20% by weight of sodium bisulfate.

5. An antistatic coating composition comprising an aqueous dispersion of the polymer sodium styrene sulfonate/N-vinyl pyrrolidone/glycidyl methacrylate (40/40/20) containing in solution 3% to 20% by weight of sodium bisulfate.

6. An antistatic coating composition comprising an aqueous dispersion of the polymer sodium styrene sulfonate/methyl methacrylate/glycidyl methacrylate (50/40/10) containing in solution 3% to 20% by weight of sodium bisulfate.

7. An antistatic coating composition comprising an aqueous dispersion of the polymer sodium styrene sulfonate/glycidyl methacrylate (90/10) containing in solution 3% to 20% by weight of sodium bisulfate.

8. A shaped article comprising synthetic linear condensation polyester fibers coated with a styrene sulfonate/glycidyl methacrylate polymer in the presence of sodium bisulfate to provide an antistatic coating of improved durability.

No references cited.